(12) United States Patent
Basso et al.

(10) Patent No.: US 6,987,735 B2
(45) Date of Patent: Jan. 17, 2006

(54) SYSTEM AND METHOD FOR ENHANCING THE AVAILABILITY OF ROUTING SYSTEMS THROUGH EQUAL COST MULTIPATH

(75) Inventors: Claude Basso, Raleigh, NC (US); Francis Arts, Turnhout (BE); Pierre Leon Debuysscher, De Pinte (BE); Olivier Didier Duroyon, McLean, VA (US); Max Robert Povse, Apex, NC (US); Natarajan Vaidhyanathan, Durham, NC (US); Colin Beaton Verrilli, Apex, NC (US)

(73) Assignees: International Business Machines Corporation, Armonk, NY (US); Alcatel, Paris (FR)

( * ) Notice: Subject to any disclaimer, the term of this patent is extended or adjusted under 35 U.S.C. 154(b) by 825 days.

(21) Appl. No.: 09/864,971

(22) Filed: May 24, 2001

(65) Prior Publication Data

US 2003/0002443 A1 Jan. 2, 2003

(51) Int. Cl.
*H04L 12/28* (2006.01)
*G06F 15/173* (2006.01)

(52) U.S. Cl. .................... 370/238; 370/409; 709/239; 709/242

(58) Field of Classification Search ......... 370/216–224, 370/230–235, 241–244, 237–238.1, 328, 370/338, 401, 409; 714/1–5; 709/207, 223–225, 709/238–243
See application file for complete search history.

(56) References Cited

U.S. PATENT DOCUMENTS

| 4,999,829 A | 3/1991 | Fite, Jr. et al. ............. 370/218 |
| 5,042,027 A | 8/1991 | Takase et al. ............... 370/252 |
| 5,182,744 A | 1/1993 | Askew et al. ............... 370/228 |
| 5,504,863 A * | 4/1996 | Yoshida ....................... 714/47 |
| 5,537,392 A | 7/1996 | Wille et al. ................. 370/248 |

(Continued)

FOREIGN PATENT DOCUMENTS

EP    0 858 189 A2    8/1998

OTHER PUBLICATIONS

Apostolopoulos, et al., "Implementation and Performance Measurements of QoS Routing Extensions of OSPF", Infocom '99, Eighteenth Annual Joint Conference of the IEEE Computer and Communications Societies Proceedings, IEEE, New York, Mar. 21, 1999, pp. 680–688.

*Primary Examiner*—Hosain Alam
*Assistant Examiner*—Van Kim T. Nguyen
(74) *Attorney, Agent, or Firm*—Scully Scott Murphy & Presser

(57) ABSTRACT

In a networking environment including one or more network processing (NP) devices and implementing a routing protocol for routing data packets from a source NP devices to destination NP devices via a switch fabric, with each network processing device supporting a number of interface ports, a system and method for enabling a routing system to recover more quickly that the routing protocol so as to significantly reduce the occurrence of lost data packets to a failed target interface/blade. The routing system is enabled to track the operational status of each network processor device and operational status of destination ports supported by each network processor device in the system, and maintains the operational status as a data structure at each network processing device. Prior to routing packets, an expedient logical determination is made as to the operational status of a target network processing device and target interface port of a current packet to be routed as represented in the data structure maintained at the source NP device. If the target blade/interface is not operations, an alternative route may be provided by ECMP. In this manner, correct routing of packets is ensured with reduced occurrence of lost data packets due to failed target NP devices/ports.

20 Claims, 2 Drawing Sheets

U.S. PATENT DOCUMENTS

| | | | | |
|---|---|---|---|---|
| 5,581,543 A | | 12/1996 | Natarajan | 370/221 |
| 5,583,848 A | | 12/1996 | Glitho | 370/248 |
| 5,590,117 A | | 12/1996 | Iida et al. | 370/248 |
| 5,629,925 A | * | 5/1997 | Pfeiffer et al. | 370/217 |
| 5,825,772 A | | 10/1998 | Dobbins et al. | 370/396 |
| 5,835,727 A | | 11/1998 | Wong et al. | 709/238 |
| 5,850,395 A | | 12/1998 | Hauser et al. | 370/398 |
| 5,854,899 A | | 12/1998 | Callon et al. | 709/238 |
| 5,881,243 A | | 3/1999 | Zaumen et al. | 709/241 |
| 5,886,643 A | * | 3/1999 | Diebboll et al. | 709/224 |
| 5,909,427 A | * | 6/1999 | Manning et al. | 370/219 |
| 5,951,651 A | | 9/1999 | Lakshman et al. | 709/239 |
| 6,032,194 A | | 2/2000 | Gai et al. | 709/239 |
| 6,049,834 A | | 4/2000 | Khabardar et al. | 709/242 |
| 6,094,685 A | | 7/2000 | Greenberg et al. | 709/227 |
| 6,104,701 A | | 8/2000 | Avargues et al. | 370/238 |
| 6,130,875 A | | 10/2000 | Doshi et al. | 370/225 |
| 6,130,891 A | | 10/2000 | Lam et al. | 370/401 |
| 6,269,330 B1 | * | 7/2001 | Cidon et al. | 709/224 |
| 6,411,599 B1 | * | 6/2002 | Blanc et al. | 370/219 |
| 6,639,895 B1 | * | 10/2003 | Helles et al. | 370/219 |
| 6,660,195 B2 | * | 12/2003 | Usui et al. | 264/46.4 |
| 6,701,449 B1 | * | 3/2004 | Davis et al. | 714/4 |
| 6,711,137 B1 | * | 3/2004 | Klassen et al. | 370/252 |
| 6,711,612 B1 | * | 3/2004 | Blumenau et al. | 709/223 |
| 6,798,740 B1 | * | 9/2004 | Senevirathne et al. | 370/219 |

* cited by examiner

FIG. 1
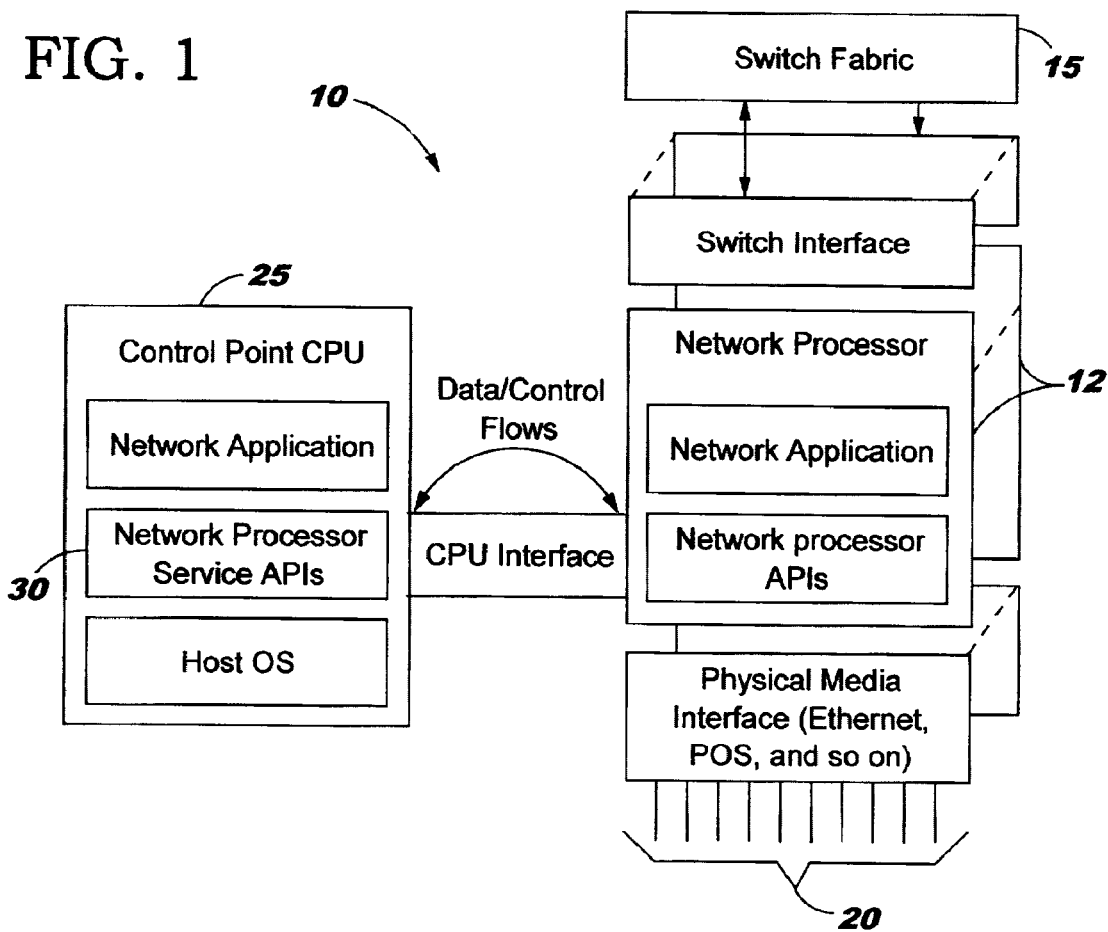
FIG. 2A
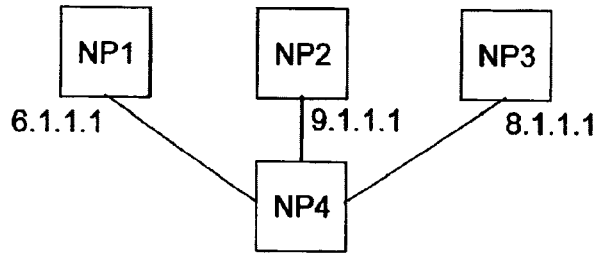
FIG. 2B
ECMP Forwarding Table
| Subnet | Action Data | Next Hop0 | Next Hop1 | Next Hop2 |
|---|---|---|---|---|
| 7.*.*.* | (30%,80%) | 9.1.1.1 | 8.1.1.1 | 6.1.1.1 |
| | | | | |

SYSTEM AND METHOD FOR ENHANCING THE AVAILABILITY OF ROUTING SYSTEMS THROUGH EQUAL COST MULTIPATH

BACKGROUND OF THE INVENTION

1. Field of the Invention

This invention relates generally to network processor-based devices, and more specifically to an improved equal cost multipath routing and recovery mechanism that enables the routing system to recover more quickly that the routing protocol.

2. Discussion of the Prior Art

In today's networked world, bandwidth is a critical resource. Increasing network traffic, driven by the Internet and other emerging applications, is straining the capacity of network infrastructures. To keep pace, organizations are looking for better technologies and methodologies to support and manage traffic growth and the convergence of voice with data.

The convergence of voice and data will play a large role in defining tomorrow's network environment. Because voice communications will naturally follow the path of lowest cost, voice will inevitably converge with data. Technologies such as Voice over IP (VoIP), Voice over ATM (VoATM), and Voice over Frame Relay (VoFR) are cost-effective alternatives in this changing market. However, to make migration to these technologies possible, the industry has to ensure quality of service (QoS) for voice and determine how to charge for voice transfer over data lines.

Integrating legacy systems is also a crucial concern for organizations as new products and capabilities become available. To preserve their investments in existing equipment and software, organizations demand solutions that allow them to migrate to new technologies without disrupting their current operations.

Eliminating network bottlenecks continues to be a top priority for service providers. Routers are often the source of these bottlenecks. However, network congestion in general is often mis-diagnosed as a bandwidth problem and is addressed by seeking higher-bandwidth solutions. Today, manufacturers are recognizing this difficulty. They are turning to network processor technologies to manage bandwidth resources more efficiently and to provide the advanced data services, at wire speed, that are commonly found in routers and network application servers. These services include load balancing, QoS, gateways, fire walls, security, and web caching.

For remote access applications, performance, bandwidth-on-demand, security, and authentication rank as top priorities. The demand for integration of QoS and CoS, integrated voice handling, and more sophisticated security solutions will also shape the designs of future remote access network switches. Further, remote access will have to accommodate an increasing number of physical mediums, such as ISDN, T1, E1, OC-3 through OC-48, cable, and xDSL modems.

A network processor (herein also mentioned as an "NP") has been defined as a programmable communications integrated circuit capable of performing one or more of the following functions:

Packet classification—identifying a packet based on known characteristics, such as address or protocol;

Packet modification—modifying the packet to comply with IP, ATM, or other protocols (for example, updating the time- to-live field in the header for IP);

Queue/policy management—reflects the design strategy for packet queuing, de-queuing, and scheduling of packets for specific applications; and, Packet forwarding—transmission and receipt of data over the switch fabric and forwarding or routing the packet to the appropriate address.

For exemplary purposes, reference is made to FIG. 1 which illustrates a logical model of a generic Network Processor system 10. As shown in FIG. 1, multiple Network Processors (NP) 12 are shown connected using a switch fabric 15, with each of the network processors supporting a large number of external LAN or WAN interface ports 20. A separate General Purpose Processor (GPP) functions as a control point (CP) 25 for the system and has a physical or logical association with all of the Network Processors 12 in the system for enabling the customization and configuration of the Network Processor (NP) devices so that they may handle the forwarding of data packets and frames. It should be understood however, that the GPP may be embedded in a network processor device itself. The generic network processor system 10 comprises two major software components: 1) the control point code base running on the GPP, and, the programmable hardware-assist processors' picocode in each of the network processors. These two software components are responsible for initializing the system, maintaining the forwarding paths, and managing the system. From a software view, the system is distributed. The GPP and each picoprocessor run in parallel, with the CP communicating with each picoprocessor using a predefined application program interface (API) 30 and control protocol.

The CP code base provides support for the Layer 2 and Layer 3 topology protocols and Layer 4 and Layer 5 network applications and systems management. Examples are protocol support for VLAN, IP, and Multiprotocol Label Switching standard (MPLS), and the supporting address- and route-learning algorithms to maintain topology information.

With particular reference to FIG. 1, and accompanying description found in commonly-owned, co-pending U.S. Pat. No. 6,769,033 entitled "NETWORK PROCESSOR PROCESSING COMPLEX AND METHODS", the whole contents and disclosure of which is incorporated by reference as if fully set forth herein, the general flow of a packet or frame received at the NP device is as follows: frames received from an network connection, e.g., Ethernet MAC, are placed in internal data store buffers by an upside "enqueue" device (EDS-UP) where they are identified as either normal data frames or system control frames (Guided Frames). In the context of the invention, frames identified as normal data frames are enqueued to an Embedded Processor Complex (EPC) which comprises a plurality of picoprocessors, e.g., protocol processors. These picoprocessors execute logic (picocode) capable of looking at the received frame header and deciding what to do with the frame (forwardly, modify, filter, etc.). The EPC has access to several lookup tables, and classification hardware assists to allow the picoprocessors to keep up with the high-bandwidth requirements of the Network Processor. A classification hardware assist device in particular, is provided for classifying frames of well known frame formats. The Embedded Processing Complex (EPC) particularly provides and controls the programmability of the NP device and includes, among other components (such as memory, dispatcher, interlaces), N processing units, referred to as GxH, which concurrently execute picocode that is stored in a common instruction memory. It is understood, however, that the architecture and structure is completely scalable towards more GxHs with the only limitation being the amount of silicon area provided in the chip. In operation, classification results from the classification hardware assist device are passed to the GxH, during frame dispatch. Each GxH preferably includes a Processing Unit core (CLP) which comprises, e.g., a 3-stage pipeline, general purpose registers and an ALU. Several GxHs in particular, are defined as General Data Handlers (GDH) each of which comprise a full CLP with the five coprocessors and are primarily used for forwarding frames. One GxH coprocessor, m particular, a Tree Search Engine Coprocessor (TSE) functions to access all tables, counters, and other data in a control memory that are needed by the picocode in performing tree searches used in forwarding data packets, thus freeing a protocol processor to continue execution. The TSE is particularly implemented for storing and retrieving information in various processing contexts, e.g., determining frame routing rules, lookup of frame forwarding information and, in some cases, frame alteration information.

Traditional frame routing capability provided in network processor devices typically utilize a network routing table having entries which provide a single next hop for each table entry. Commonly-owned U.S. Pat. No. 6,721,800 entitled SYSTEM USING WEIGHTED NEXT HOP OPTION IN ROUTING TABLE TO INCLUDE PROBABILITY OF ROUTING A PACKET FOR PROVIDING EQUAL COST MULTIPATH FORWARDING PACKETS, the whole content and disclosure of which is set forth herein, describes a system and method for providing the ability for a network processor to select from multiple next hop options for a single forwarding entry.

FIG. 2(a) depicts an example network processor frame routing scenario 40 and FIG. 2(b) illustrates an example Equal Cost Multipath Forwarding (ECMP) table 50 that may be used to provide a lookup of a next hop address for forwarding packets as described in commonly-owned, co-pending U.S. patent application Ser. No. 09/546,702. Preferably, such a table is employed in a Network Processor (NP) device having packet routing functions such as described in commonly-owned, co- pending U.S. patent application Ser. No. 09/384,691.

Thus, the example ECMP forwarding table 50 illustrated in FIG. 2(b), is particularly implemented in a frame forwarding context for network processor operations. In the example ECMP forwarding table 50, there is provided subnet destination address fields 52, with each forwarding entry including multiple next hop routing information comprising multiple next hop address fields, e.g., fields 60a–60c. Additionally provided in the ECMP routing table is cumulative probability data for each corresponding next hop such as depicted in action data field 70. Particularly, in the exemplary illustration of the ECMP packet forwarding table 50 of FIG. 2(b), there is included three (3) next hop fields to addresses 9.1.1.1, 8.1.1.1, 6.1.1.1 associated with a destination subnet address 7.*.*.*. An action data field 70 includes threshold values used to weight the probability of each next hop and is used to determine which next hop will be chosen. In the action field 72, shown in FIG. 2(b), these values as being stored as cumulative percentages with the first cumulative percentage (30%) corresponding to next hop 0, the second cumulative percentage value (80%) corresponding to next hop 1, etc. This means that, the likelihood of routing a packet through next hop 0 is 30% (i.e., approximately 30% of traffic for the specified table entry should be routed to next hop 0), and, the likelihood of routing a packet through next hop 1 is 50% (i.e., approximately 50% of traffic for the specified table entry should be routed to next hop 1). This technique may be extended to offer as many next hops as desired or feasible.

Currently, in such network processing systems, if a destination NP device (hereinafter referred to as Targetblade or blade) or interface (such as a port or TargetPort) associated with the target blade and capable of handling the frame type fails, i.e., the packet or frame cannot be routed to the correct destination set forth in the ECMP forwarding table. However, it is often the case that the other Network Processors (NP's) in the system will continue to attempt to forward frames through the failed interface/blade until the routing protocol, e.g., the Open Shortest Path First (OSPF) protocol which enables routers to understand the internal network architecture, i.e., within an autonomous network, and calculate the shortest path from an IP Source Address (SA) to IP Destination Address (DA), detects the failed link and downloads a new forwarding entry that avoids the failed interface/blade. The time for this routing protocol to detect the failed link could be relatively long, and during this period all the data packets routed through the failed interface/blade may be lost.

Consequently, it would be highly desirable to provide a methodology that would enable a routing system to recover more quickly that the routing protocol so as to significantly reduce the occurrence of lost data packets to a failed target interface/blade with minimal performance penalty.

SUMMARY OF THE INVENTION

Accordingly, it is an object of the present invention to provide a network processor with a system that that would enable a routing system to recover more quickly that the routing protocol so as to significantly reduce the occurrence of lost data packets to a failed target interface/blade.

It is another object of the present invention to provide in a network processor system, a method of maintaining the operational status of all the network processors (blades) in the routing system so that packet forwarding issues resulting from a failed interface/blade may be quickly resolved without the loss of data packets routed in the system with minimal performance penalty.

In accordance with the preferred embodiment of the invention there is provided for a networking environment including one or more network processing (NP) devices and implementing a routing protocol for routing data packets from a source NP devices to destination NP devices via a switch fabric, with each network processing device supporting a number of interface ports, a system and method for enabling a routing system to recover more quickly that the routing protocol so as to significantly reduce the occurrence of lost data packets to a failed target interface/blade. The routing system is enabled to track the operational status of each network processor device and operational status of destination ports supported by each network processor device in the system, and maintains the operational status as a data structure at each network processing device.

Prior to routing packets, an expedient logical determination is made as to the operational status of a target network processing device and target interface port of a current packet to be routed as represented in the data structure maintained at the source NP device. In this manner, correct routing of packets is ensured with reduced occurrence of lost data packets due to failed target NP devices/ports.

BRIEF DESCRIPTION OF THE DRAWINGS

Further features, aspects and advantages of the apparatus and methods of the present invention will become better understood with regard to the following description, appended claims, and accompanying drawings where:

FIG. 1 illustrates a logical model of a generic Network Processor system 10.

FIG. 2(a) depicts an example network processing scenario 40 including network processors (routers) employing a packet routing table such as an ECMP forwarding table.

FIG. 2(b) illustrates an example ECMP forwarding table for use in a network processor, router or packet switching device according to the example network processing scenario of FIG. 2(a).

DETAILED DESCRIPTION OF THE PREFERRED EMBODIMENT

Figure 3:
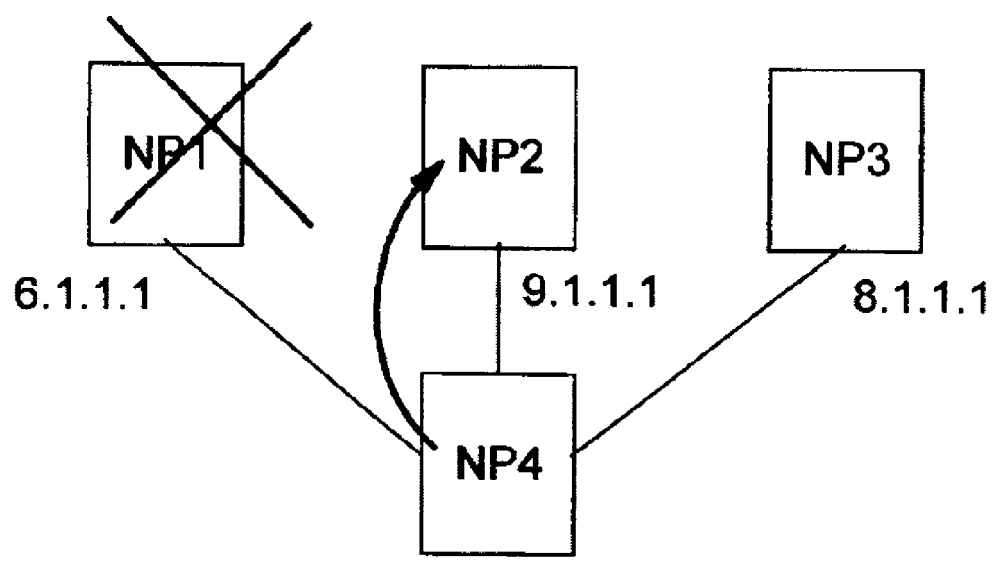
FIG. 3 illustrates the determination of a failed link to Target Blade associated with ECMP next hop destination NP1 for the example network processing scenario of FIG. 2(a), and the resulting decision to re-route the frame to an operation destination NP2 according to the example ECMP table.

A first method of maintaining operational status at the blade/NP level involves implementation of a data structure (hereinafter referred to as opStatus) that is maintained by each NP device. This opStatus data structure includes information representing the operational status of all the network processors (blades/ports) in the routing system and, for example, may comprises a bit vector of sixty-four (64) bits long (in an example system employing 64 NP devices). If the ith bit is set, for instance, then the ith NP/blade is indicated as operational.

In operation, after choosing the next hop according to ECMP rules, the layer-3 forwarding picocode will check the operational status of the NP/blade through which the chosen next hop is reachable. If that NP is not operational, then a different equal-cost next hop (the next hop with the smallest index) that is reachable through an operational NP/blade will be chosen. FIG. 3 illustrates the determination of a failed link to Target Blade associated with ECMP next hop destination NP1, and the resulting decision to re-route the frame to an operation destination NP2 according to the ECMP table. That is, in each NP, the operational status of the TB for each packet routed is checked. If the destination TB is down, then a different Next Hop is chosen as suggested by the ECMP table. It should be understood that the particular user application will detect failures and update the opStatus data structure accordingly.

This first solution essentially maintains the operational status at the TB (blade)/NP level. In order to extend this solution to an interface/port (TB/TP) level, there needs to be maintained a datastructure that is 64×16 bits long, assuming each blade in the example system maintains sixteen (16) ports, for instance. Since the opStatus datastructure is consulted in the main forwarding path, it must be stored in a fast, expensive memory.

Another solution relies on the assumption that the interface/blade failures are rare and it is unlikely that more than one blade will fail at the same time. The advantage of tracking a single failure is the reduction of the size of the opStatus data structure. The current solution only requires 48 bits in expensive high-speed memory where as the previous solution required 64×16 bits in such a memory.

Thus, the following data structure may be maintained in each NP device in the routing system.

```
{
    Uint 16 failedBlade; /* Use the value of 0xffff if all blades are
                                operational */
    Uint 16 failedPortMask;
    Uint 16 failedPortValue;
}
```

According to this embodiment, the following algorithm is invoked to check whether a given TB, TP is operational:

```
Boolean is Operational (TB, TP) {
    If (failedBlade == 0xffff)
            /* all blades are operational */
            return TRUE;
    If ((TB == failedBlade) && (TP & failedPortMask ==
    failed PortValue))
            /* where && is the logical AND operator */
            /* where & is a bitwise AND operator*/
            Return FALSE;
    Else
            Return TRUE;
}
```

According to this algorithm, if all blades are operational, the routing of packets throughout the system will continue and no ECMP re-routing is necessary. However, only if both a Target Blade is a failed blade AND the result of the bitwise operation between the Target Port and failedPort Mask is equal to the failedPortValue, then a FALSE is returned and the ECMP table invoked for re-routing subsequent packets to another TB or TP. If a TRUE is returned, i.e., either the Target Blade is not a failed blade or the result of the bitwise operation between the Target Port and failedPort Mask is not equal to the failedPortValue, then the packet will still be routed to the destination TB/TP.

It should be understood that this solution may handle individual failures at port, data move unit (DMU) and blade levels. However, multiple blade failures cannot be handled by this solution. As an example, if all the interfaces in all the blades are operational then failedBlade will contain the value of 0xffff and the values of failedPortMask and failedPortValue will be ignored. If the blade number, e.g., bladeNum, is not operational (i.e., all the ports in that blade have failed) then failedBlade will include bladeNum and faildPortMask will contain the value of 0 and failedPortValue will contain the value of 0. If the port numbered portNum in the blade numbered bladeNum is not operational, then failedBlade will contain bladeNum and failedPortMask will contain the value of 0xffff and the failedPortValue will contain the value of portNum. Assuming a blade having four data move units (DMUs) of four ports each, the ports in DMU A have last (least significant) 2 bits set to 00, the ports in DMU B have last 2 bits set to 01, the ports in DMU C have last 2 bits set to 10, and the ports in DMU D have last 2 bits set to 11. If DMU C were to fail in blade numbered bladeNum, failedBlade will contain the value of bladeNum, and failedPortMask will contain the value of 0x0003 and failedPortValue will contain the value of 0x0002.

In the preferred embodiment, a range is used to represent the failed blades and a mask on the port number to represent the set of failed ports. This solution only requires 32 bits of high-speed memory. The following data structure will be maintained in all of the NPs in the preferred embodiment:

```
{
    Uint 8 beginFailedBlade;/* unsigned integer representing begin
                              value range of failed blades */
    Uint 8 endFailedBlade;/* end value of range of failed blades */
    Uint 8 failedPortMask;
    Uint failedPortValue;
}
```

According to this data structure, if failedPortMask and failedPortValue are both 0xff, then all blades will be considered operational. This convention is founded on the assumption that no port is numbered 0xff.

According to this embodiment, the following algorithm is invoked to check whether a given TB, TP is operational:

```
Boolean isOperational (TB, TP) {
    If ((failedPortMask ==0xff) && (failedPortValue == 0xff))
    /* all blades are operational */
    /* 1-cycle, 1 picocode instruction can perform this test */
        returnTRUE;
    If (TB < beginFailedBlade) return TRUE;
    If (TB > endFailedBlade) return TRUE;
    If (TP & failedPortMask != failedPortValue) return TRUE;
    Return FALSE;
}
```

According to this algorithm, if all blades are operational, then both failedPortMask and failedPortValue are set to 0xff and the values of the other fields are ignored. This is a simple test that may be performed in one machine cycle. If the blade numbered bladeNum is not operational (i.e., all the ports in that blade have failed) then, according to this algorithm, beginFailedBlade and endFailedBlade are set as bladeNum, failedPortMask is set as 0, and failedPortValue is set as 0.

However, if the blades numbered, for example 8, 9, and 10 are not operational then set beginFailedBlade as 8 endFailedBlade as 10 failedPortMask as 0 and failedPortValue as 0

If the port numbered portNum in the blade numbered bladeNum is not operational, then, according to this algorithm, beginFailedBlade is set as bladeNum endFailedBlade is set as bladeNum failedPortMask is set as 0xff failedPortValue is set as portNum The ports in DMU A have last (least significant) 2 bits set to 00. The ports in DMU B have last 2 bits set to 0 1. The ports in DMU C have last 2 bits set to 10 and the ports in DMU D have last 2 bits set to 11. In an example scenario when all the ports in DMU C fail in blade numbered bladeNum, then, according to this algorithm, beginFailedBlade is set as bladeNum endFailedBlade is set as bladeNum failedPortValue is set as 0b 0000 0010 and failedPortMask is set as 0b 0000 0011

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. In a networking environment comprising one or more network processing (NP) devices for routing data packets from a source to a destination via a switch fabric, with each network processing device supporting a number of interface ports, a system for ensuring packet routing from one network processing device to a target network processing device via a target interface port, said system comprising:

mechanism for tracking operational status of each network processor device and operational status of destination ports supported by each said network processor device in said system, said operational status being maintained at each network processing device;

said network processor devices including mechanism for determining the operational status of a target network processing device and target interface port of a current packet to be routed prior to said routing, routing mechanism for routing packets from source NP devices to destination NP devices and destination ports thereof in accordance with an Equal Cost Multi-Path ECMP protocol implementing a next hop routing table for mapping a destination address associated with a packet to be forwarded to one or more next hop options in said networking environment, said routine mechanism routing said current packet to a target network processor device and destination port when said target network processor device and destination ports thereof are determined as operational, and routing packets to another operational NP device and port thereof upon determination of non-operational target network processor device and destination port, whereby proper routing of packets is guaranteed with minimum packet lost.

2. The system for ensuring packet routing in accordance with claim 1, wherein each network processor device maintains a data structure receiving values from said tracking mechanism indicating status of said network processor devices, said determining mechanism implementing logic for comparing said received value against a first value indicating all NP devices are operational prior to routing of a current packet, and initiating routing of said packet to said target when said values match.

3. The system for ensuring packet routing in accordance with claim 2, wherein said received value is a second value representing a particular NP device that is not operational, said determining mechanism implementing logic for comparing a bit representation of a target NP device of a packet to be routed against this received second value and initiating routing of said packet to another NP device when said target NP device is not operational.

4. The system for ensuring packet routing in accordance with claim 1, wherein each network processor device maintains a data structure receiving values from said tracking mechanism indicating status of said network processor devices, said determining mechanism implementing logic for comparing said received value against a first value indicating all interface ports for said NP devices are operational prior to routing of a current packet, and initiating routing of said packet to said NP device and target port when said values match.

5. The system for ensuring packet routing in accordance with claim 4, wherein said first value includes a set of mask bits and a set of bits representing said target destination port, said determining mechanism implementing bitwise logic for comparing said received value against said mask bit set and obtaining a first result, comparing said first result against said target destination port bits, and initiating re-routing of said packet to another destination port when said first result does not match said target destination port bits.

6. The system for ensuring packet routing in accordance with claim 4, wherein said data structure receives two values defining a range of NP devices that are not operational, said determining mechanism implementing logic for comparing a bit representation of a target NP device of a packet to be routed against said each of said two values defining said range, and initiating re-routing of said packet to another destination port outside said range when said bit representation of said target NP device falls within said two values.

7. A method for ensuring packet routing in a networking environment comprising one or more network processing (NP) devices for routing data packets from a source to a destination via a switch fabric, with each network processing device supporting a number of interface ports, said method comprising the steps of:
   a) tracking operational status of each network processor device and operational status of destination ports supported by each said network processor device in said system, and maintaining said operational status at each network processing device;
   b) determining the operational status of a target network processing device and target interface port of a current packet to be routed prior to said routing at a current NP device; and
   c) routing packets from source devices to destination NP devices and destination ports thereof in accordance with an Equal Cost Multi-Path (ECMP) protocol, said ECMP protocol adapted for mapping a destination address associated with a packet to be forwarded to one or more next hop options in said networking environment, wherein a current pocket is routed to a target network processor device and destination port when said target network processor device and destination ports thereof are determined as operational, or being routed to another operational NP device and port thereof upon determination of non-operational target network processor device and destination port, whereby proper routing of packets is guaranteed with minimum packet lost.

8. The method for ensuring packet routing in accordance with claim 7, wherein said step of maintaining said operational status includes maintaining a data structure for receiving values determined from said tracking step indicating status of said network processor devices.

9. The method for ensuring packet routing in accordance with claim 8, wherein said determining step b) includes the step of implementing logic for comparing a received value against a first value indicating all NP devices are operational prior to routing of a current packet, and initiating routing of said packet to said target when said values match.

10. The method for ensuring packet routing in accordance with claim 9, wherein said received value is a second value representing a particular NP device that is not operational, said determining step b) including the step of implementing logic for comparing a bit representation of a target NP device of a packet to be routed against this received second value and initiating routing of said packet to another NP device when said target NP device is not operational.

11. The method for ensuring packet routing in accordance with claim 8, wherein said determining step b) includes the step of implementing logic for comparing said received value against a first value indicating all interface ports for said NP devices are operational prior to routing of a current packet, and initiating routing of said packet to said NP device and target port when said values match.

12. The method for ensuring packet routing in accordance with claim 11, wherein said first value includes a set of mask bits and a set of bits representing said target destination port, said determining step b) including the step of implementing bitwise logic for comparing said received value against said mask bit set and obtaining a first result, comparing said first result against said target destination port bits, and initiating re-routing of said packet to another destination port when said first result does not match said target destination port bits.

13. The method for ensuring packet routing in accordance with claim 11, wherein said data structure receives two values defining a range of NP devices that are not operational, said determining step b) implementing logic for comparing a bit representation of a target NP device of a packet to be routed against said each of said two values defining said range, and initiating re-routing of said packet to another destination port outside said range when said bit representation of said target NP device falls within said two values.

14. A program storage device readable by a machine, tangibly embodying a program of instructions executable by the machine to perform method steps for ensuring packet routing in a networking environment comprising one or more network processing (NP) devices for routing data packets from a source to a destination via a switch fabric, with each network processing device supporting a number of interface ports, said method steps comprising:
   a) tracking operational status of each network processor device and operational status of destination ports supported by each said network processor device in said system, and maintaining said operational status at each network processing device;
   b) determining the operational status of a target network processing device and target interface port of a current packet to be routed prior to said routing at a current NP device; and,
   c) routing packets from source NP devices to destination NP devices and destination ports thereof in accordance with an Equal Cost Multi-Path (ECMP) protocol, said ECMP protocol adapted for mapping a destination address associated with a packet to be forwarded to one or more next hop options in said networking environment, wherein a current packet is routed to a target network processor device and destination port when said target network processor device and destination ports thereof are determined as operational, or being routed to another operational NP device and port thereof upon determination of non-operational target network processor device and destination port, whereby proper routing of packets is guaranteed with minimum packet lost.

15. The program storage device readable by a machine in accordance with claim 14, wherein said step of maintaining said operational status includes maintaining a data structure for receiving values determined from said tracking step indicating status of said network processor devices.

16. The program storage device readable by a machine in accordance with claim 15, wherein said determining step b) includes the step of implementing logic for comparing a received value against a first value indicating all NP devices are operational prior to routing of a current packet, and initiating routing of said packet to said target when said values match.

17. The program storage device readable by a machine in accordance with claim 16, wherein said received value is a second value representing a particular NP device that is not operational, said determining step b) including the step of implementing logic for comparing a bit representation of a target NP device of a packet to be routed against this received second value and initiating routing of said packet to another NP device when said target NP device is not operational.

18. The program storage device readable by a machine in accordance with claim 17, wherein said determining step b) includes the step of implementing logic for comparing said received value against a lust value indicating all interface ports for said NP devices are operational prior to routing of a current packet, and initiating routing of said packet to said NP device and target port when said values match.

19. The program storage device readable by a machine in accordance with claim 18, wherein said first value includes a set of mask bits and a set of bits representing said target destination port, said determining step b) including the step of implementing bitwise logic for comparing said received value against said mask bit set and obtaining a first result, comparing said first result against said target destination port bits, and initialing re-routing of said packet to another destination port when said first result does not match said target destination port bits.

20. The program storage device readable by a machine in accordance with claim 15, wherein said data structure receives two values defining a range of NP devices that are not operational, said determining step b) implementing logic for comparing a bit representation of a target NP device of a packet to be routed against said each of said two values defining said range, and initiating re-routing of said packet to another destination port outside said range when said bit representation of said target NP device falls within said two values.

* * * * *